United States Patent [19]

Yanaka

[11] Patent Number: 5,206,781
[45] Date of Patent: Apr. 27, 1993

[54] MAGNETIC TAPE CASSETTE HAVING A PROTECTIVE PLUG TO AVOID ERRONEOUS ERASURE

[75] Inventor: Kiyotaka Yanaka, Tokyo, Japan
[73] Assignee: Sony Corporation, Tokyo, Japan
[21] Appl. No.: 622,779
[22] Filed: Dec. 5, 1990

[30] Foreign Application Priority Data

Dec. 6, 1989 [JP] Japan ................... 1-317029

[51] Int. Cl.$^5$ .............. G11B 23/02; G11B 15/04; G11B 19/04; G03B 1/04
[52] U.S. Cl. .................... 360/132; 360/60; 242/198
[58] Field of Search ............ 360/60, 132; 206/444; 242/198

[56] References Cited

U.S. PATENT DOCUMENTS

| 3,686,470 | 11/1990 | Stahlberg et al. | 179/100.2 Z |
| 4,347,537 | 8/1982 | Schoettle et al. | 360/132 |
| 4,412,260 | 10/1983 | Stricklin et al. | 360/132 |
| 4,507,692 | 3/1985 | Sasaki | 360/60 |
| 4,703,384 | 10/1987 | Kawada et al. | 360/132 |
| 4,734,812 | 3/1988 | Tanaka et al. | 360/132 |
| 4,791,504 | 12/1988 | Igarashi et al. | 360/60 |
| 4,844,377 | 7/1989 | Shiomi et al. | 360/132 |
| 4,860,127 | 8/1989 | Takahashi et al. | 360/133 |
| 5,048,008 | 9/1991 | Haruna | 206/444 |
| 5,087,998 | 2/1992 | Oishi | 360/132 |

FOREIGN PATENT DOCUMENTS

| 0169546 | 1/1986 | European Pat. Off. . | |
| 0260000 | 3/1988 | European Pat. Off. . | |
| 274566 | 7/1988 | European Pat. Off. | 360/60 |
| 0274566 | 7/1988 | European Pat. Off. . | |
| 1-102788 | 4/1989 | Japan | 360/60 |
| 1-294252 | 11/1989 | Japan | 360/60 |
| 2163409 | 2/1986 | United Kingdom . | |

OTHER PUBLICATIONS

Patent Abstracts of Japan, vol. 13, No. 345 (P-909) (3693) Aug. 3, 1989 & JP-A-1 102 788 (Sony Corp.) Apr. 20, 1989, abstract.
Patent Abstracts of Japan, vol. 7, No. 150 (P-207) (1295) Jun. 30, 1983 & JP-A-58 060 475 (Sony K.K.) Apr. 9, 1983, abstract.

*Primary Examiner*—Stuart S. Levy
*Assistant Examiner*—Jefferson Evans
*Attorney, Agent, or Firm*—Lewis H. Eslinger; Jay H. Maioli

[57] ABSTRACT

A magnetic tape cassette includes a sliding member, a stopper for preventing the sliding member from being disengaged and a positioning click stopper for engaging the sliding member at a switching position at which an erase possible condition and an erasure preventing condition are chosen, the prevention stopper and the click stopper being independently provided between the sliding member inserted into an aperture in the thickness direction of the cassette casing and the insertion aperture bored through the cassette casing. The click stopper is formed of a stop portion and a guide portion continuous to the stop portion so that the switching operation of the sliding member can be performed smoothly. Thus, the magnetic tape cassette can be placed in the erase possible condition and the erasure preventing condition easily and positively. Further, when the sliding member is pushed too strongly in the switching operation or when the sliding member is worn, this sliding member can be prevented from being disengaged and the erasure can be positively avoided.

5 Claims, 5 Drawing Sheets

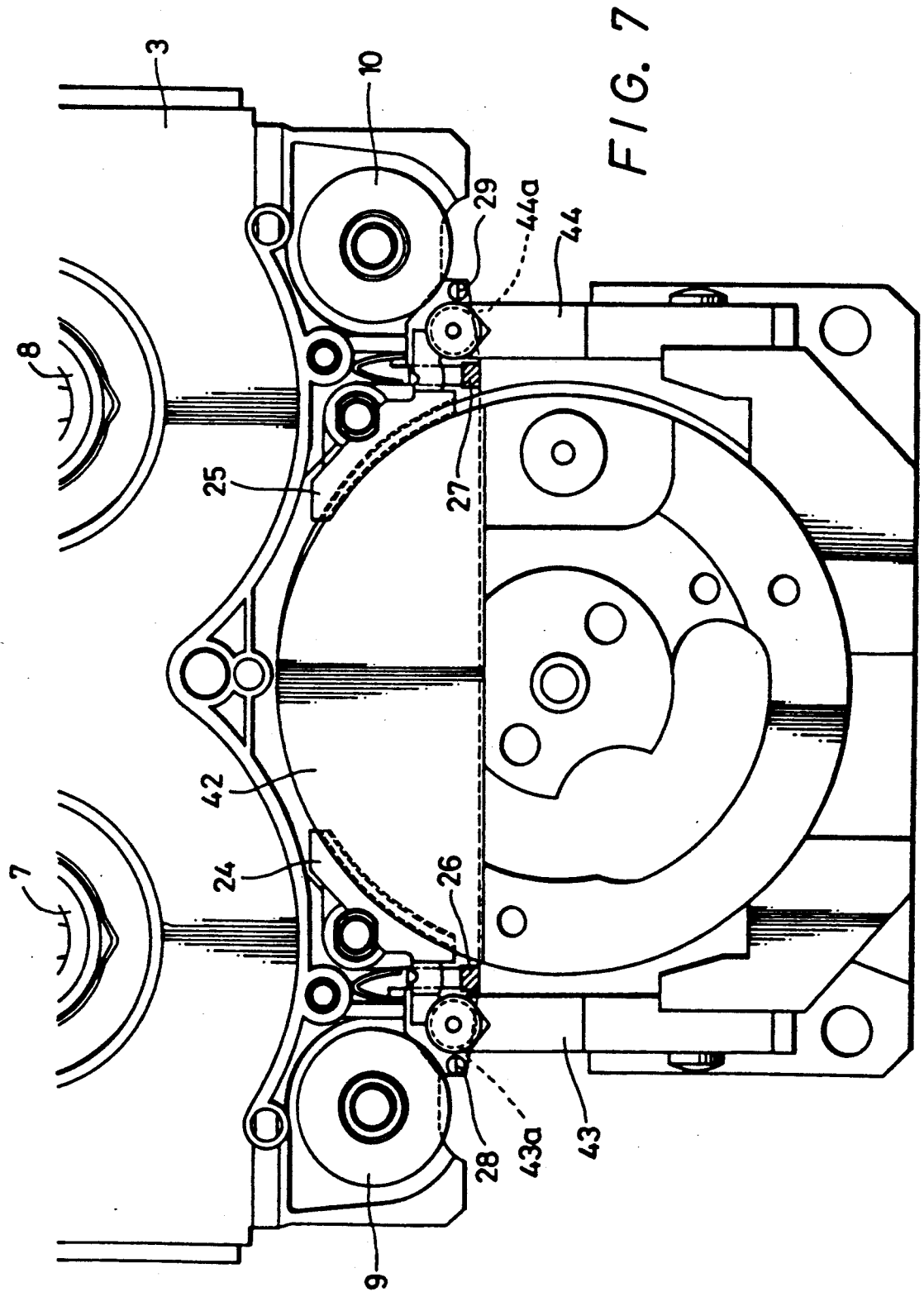

MAGNETIC TAPE CASSETTE HAVING A PROTECTIVE PLUG TO AVOID ERRONEOUS ERASURE

BACKGROUND OF THE INVENTION

1. Field of the Invention

This invention generally relates to magnetic tape cassettes in which a tape-shaped record medium is accommodated in a wound form and, more particularly, is directed to a magnetic tape cassette in which a recorded signal can be prevented from being inadvertently or unintentionally erased by the use of a protective plug slidable in the thickness direction of a cassette casing.

2. Description of the Prior Art

In the prior art, the tape cassette is provided with a mis-erase preventing means so that a signal recorded on a magnetic tape accommodated therein can be prevented from being erased inadvertently.

As the erasure preventing means, such type is proposed, in which a protruding preventing tab is integrally formed with the tape cassette and this protruded tab is cut away to avoid the erasure. In this type of mis-erase preventing means, the protruded tab, once cut away, cannot be reattached to the tape cassette. Further, if the cutaway portion is not closed by another member and is left opened, a new signal cannot be recorded on the magnetic tape. To solve the aforenoted problem, a switching type of erasure preventing means is proposed, in which a cassette casing is provided with a sliding member slidable in the thickness direction of the cassette casing and this sliding member is selectively slid between an erase possible position and an erasure preventing position to thereby prevent the recorded signal from being erased inadvertently.

Japanese Patent Laid-Open Gazette No. 1-102788 describes the above-mentioned sliding member switching type of erasure preventing means. In this sliding member switching type of erasure preventing means, first and second engaging convex portions are formed on the sliding member at its position displaced from the sliding direction of the sliding member in an opposing relation to each other with respect to the sliding member. Also, opposing first and second engaged concave portions are formed in insertion apertures of the cassette casing at the positions coincident with the sliding direction of the sliding member. Thus, when the first engaging convex portion is engaged with the first engaged concave portion, the sliding member is brought in to the first position. Further, when the second engaging convex portion is engaged with the second engaged concave portion, the sliding member is brought in to the second position, whereby the tape cassette is set in the erase possible state and in the erasure preventing state.

According to the thus constructed conventional erasure preventing means of the sliding direction of the sliding member, the tape cassette can be repeatedly set in the erase possible condition and in the erasure preventing condition by switching the sliding of the sliding member, and by engaging the engaging convex portions with the engaged concave portions at the respective switching positions, the sliding member can be engaged at the two switching positions, ensuring that the two conditions can be detected. However, this sliding member switching slide operation encounters with the following problem. That is, under the condition that the first and second convex portions of the sliding member are disengaged from the first and second engaged concave portions of the insertion apertures or under the condition that the two engaging convex portions are disengaged from the two engaged convex portions and brought in contact with the inner wall surface of the insertion apertures, the two engaging convex portions are considerably urged against the inner wall surface to thereby hinder the sliding member from being slid smoothly. Accordingly, the sliding member must be pushed by a very large pushing force. There is then the substantial risk that the sliding member and the cassette casing may be damaged.

OBJECTS AND SUMMARY OF THE INVENTION

Accordingly, it is an object of the present invention to provide an improved magnetic tape cassette having a protective plug to avoid erroneous erasure in which the aforementioned short comings and disadvantages of the prior art can be eliminated.

More specifically, it is an object of the present invention to provide a magnetic tape cassette having a protective plug to avoid erroneous erasure in which a magnetic tape cassette can be positively set in an erase possible condition and an erasure preventing condition with ease.

It is another object of the present invention to provide a magnetic tape cassette in which a signal recorded on a magnetic tape can be positively prevented from being erased inadvertently.

It is a further object of the present invention to provide a magnetic tape cassette which is high in reliability.

It is an additional object of the present invention to provide a magnetic tape cassette having a protective plug to avoid erroneous erasure which is suitably applied to a magnetic tape cassette of very small type.

As an aspect of the present invention, a magnetic tape cassette is comprised of a stopper means for preventing a protective plug from being disengaged and a positioning click stopper means for engaging the protective plug to a switching position at which an erase possible condition and an erasure preventing condition are chosen, the prevention stopper means and the click stopper means being independently situated between the protective plug inserted into the thickness direction of the cassette casing and an insertion aperture in which the protective plug is inserted. The click stopper means is formed of a stop portion and a guide portion continuous to the stop portion so that the switching operation of the protective plug can be performed smoothly. Thus, the magnetic tape cassette can be placed in the erase possible condition and the erasure preventing condition easily and positively. Further, when the protective plug is pushed too strongly in the switching operation or when the protective plug is worn, the protective plug can be prevented from being disengaged and the erasure can be positively avoided.

The above, and other objects, features and advantages of the present invention will be apparent in the following detailed description of a preferred embodiment when read in conjunction with the accompanying drawings, in which like reference numerals are used to identify the same or similar parts in the several views.

BRIEF DESCRIPTION OF THE DRAWINGS

FIG. 7 is a partial plan view illustrating the head drum and the magnetic tape cassette from a lower cassette half side under the condition that the head drum is inserted into the magnetic tape cassette.

DETAILED DESCRIPTION OF THE PREFERRED EMBODIMENT

Figure 3:
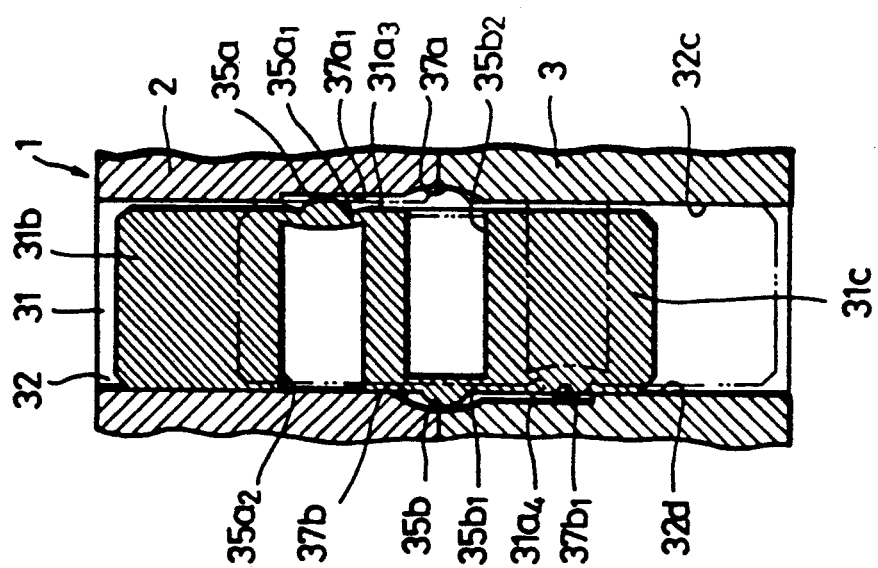
FIG. 3 is a diagrammatic view of a section taken through the line A—A of FIG. 2.

An embodiment of a magnetic tape cassette according to the present invention will hereinafter be described with reference to FIGS. 1 to 7. The tape cassette of this embodiment is of a very small type.

As illustrated, a magnetic tape cassette casing 1 is provided to accommodate therein a magnetic tape T on and from which a PCM (pulse code modulated) signal is recorded and reproduced. This cassette casing 1 is formed by fastening an upper half or an upper part 2 and a lower half or a lower part 3 by screws 4, and a lid 6 that is pivotally attached to the cassette casing 1 so as to cover and uncover an opening portion 5 formed on the front surface sides of the two upper and lower parts 2 and 3.

The magnetic tape T is accommodated within the cassette casing 1, i.e. between the upper and lower parts 2 and 3 under the condition such that the magnetic tape T is wound around a pair of hubs 7 and 8 provided in correspondence with hub drive shaft insertion apertures 2a, 2b and 3a, 3b. One portion of the magnetic tape T is exposed to the front surface side opening portion 5 under the condition such that it is extended between pinch rollers 9 and 10 serving as guide rollers pivotally supported to both sides of the opening portion 5.

Figure 6:
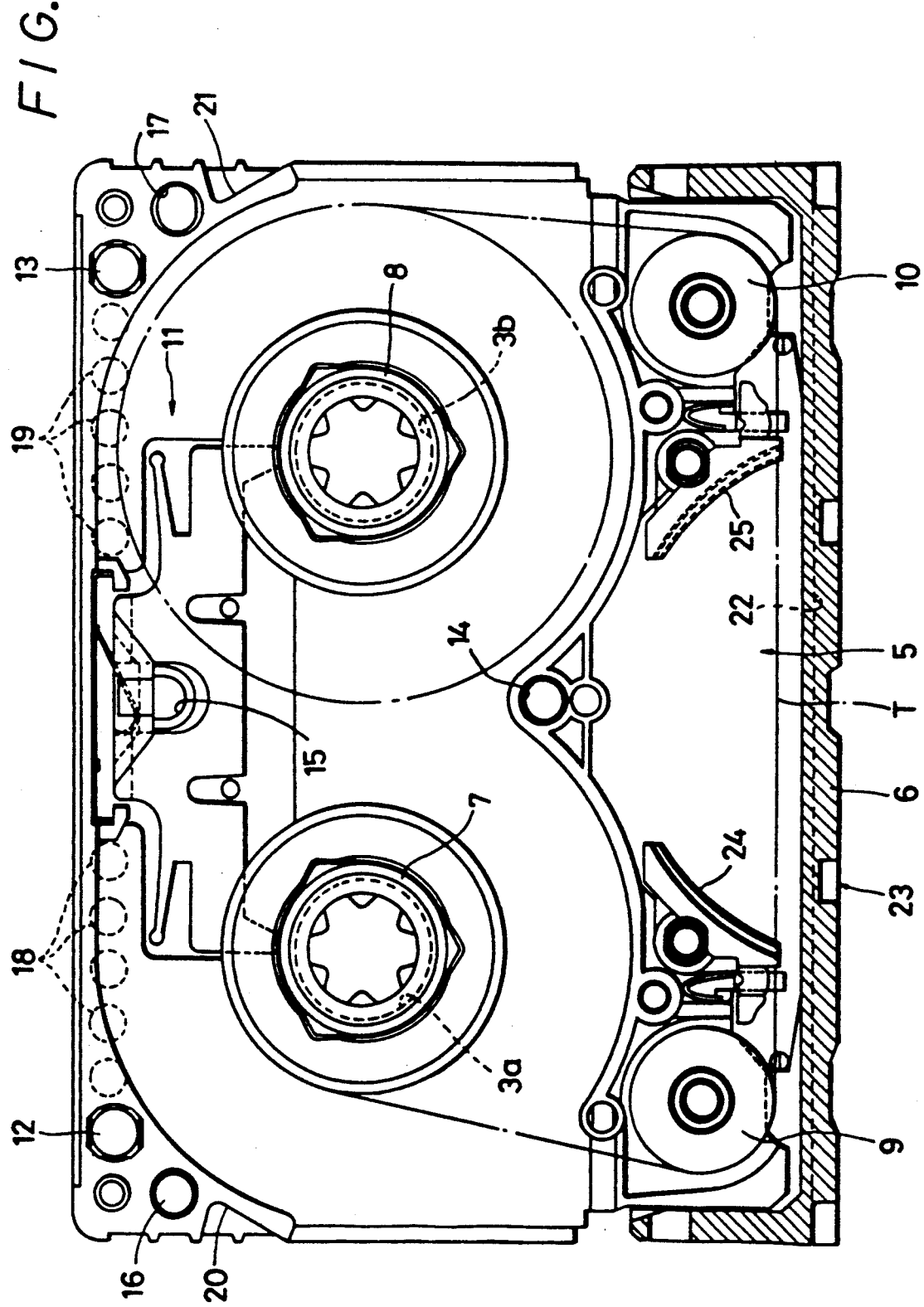
FIG. 6 is a plan view illustrating the magnetic tape cassette from a lower cassette half side.

As shown in, for example, FIG. 6, a brake mechanism 11 is provided within the cassette casing 1 to brake the two hubs 7 and 8 when this tape cassette is not in use. Erasure preventing mechanisms 12 and 13 are provided on the upper and lower surface sides of the cassette casing 1 at its two rear corner portions so as to communicate with the upper and lower parts 2 and 3. Positioning reference apertures 14, 15, and 16, 17 are respectively formed on the cassette casing 1 at its front and back positions in the front to back direction and at its two rear side portions in the lateral direction. A plurality of predetermined detection holes 18 and 19 are formed on the cassette casing 1 at its rear edge portion in the lateral direction. Further, grip portions 20 and 21 are formed on the rear portions of two side walls of the cassette casing 1.

Figure 4:
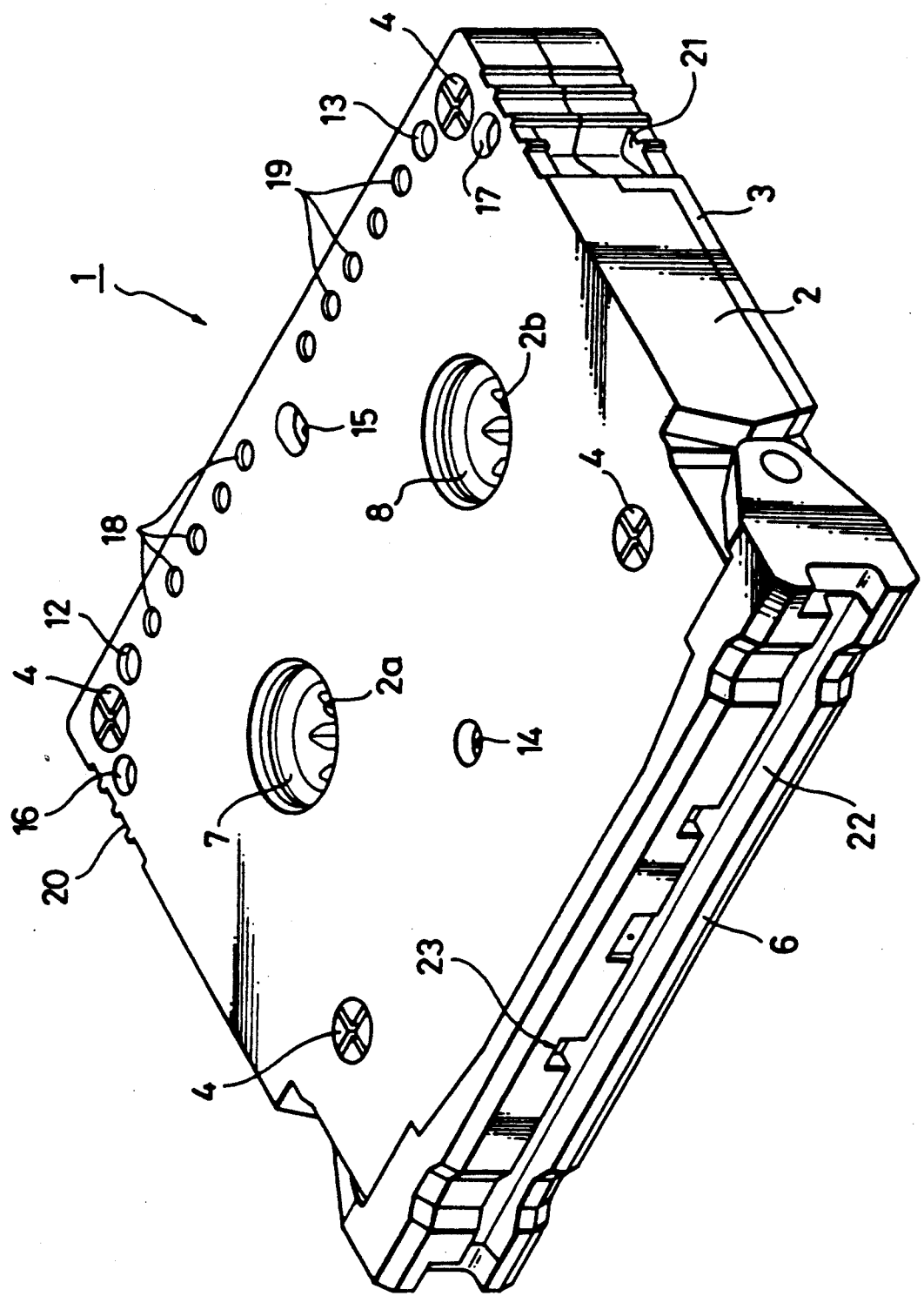
FIG. 4 is a perspective view illustrating an embodiment of a magnetic tape cassette according to the present invention.
Figure 5:
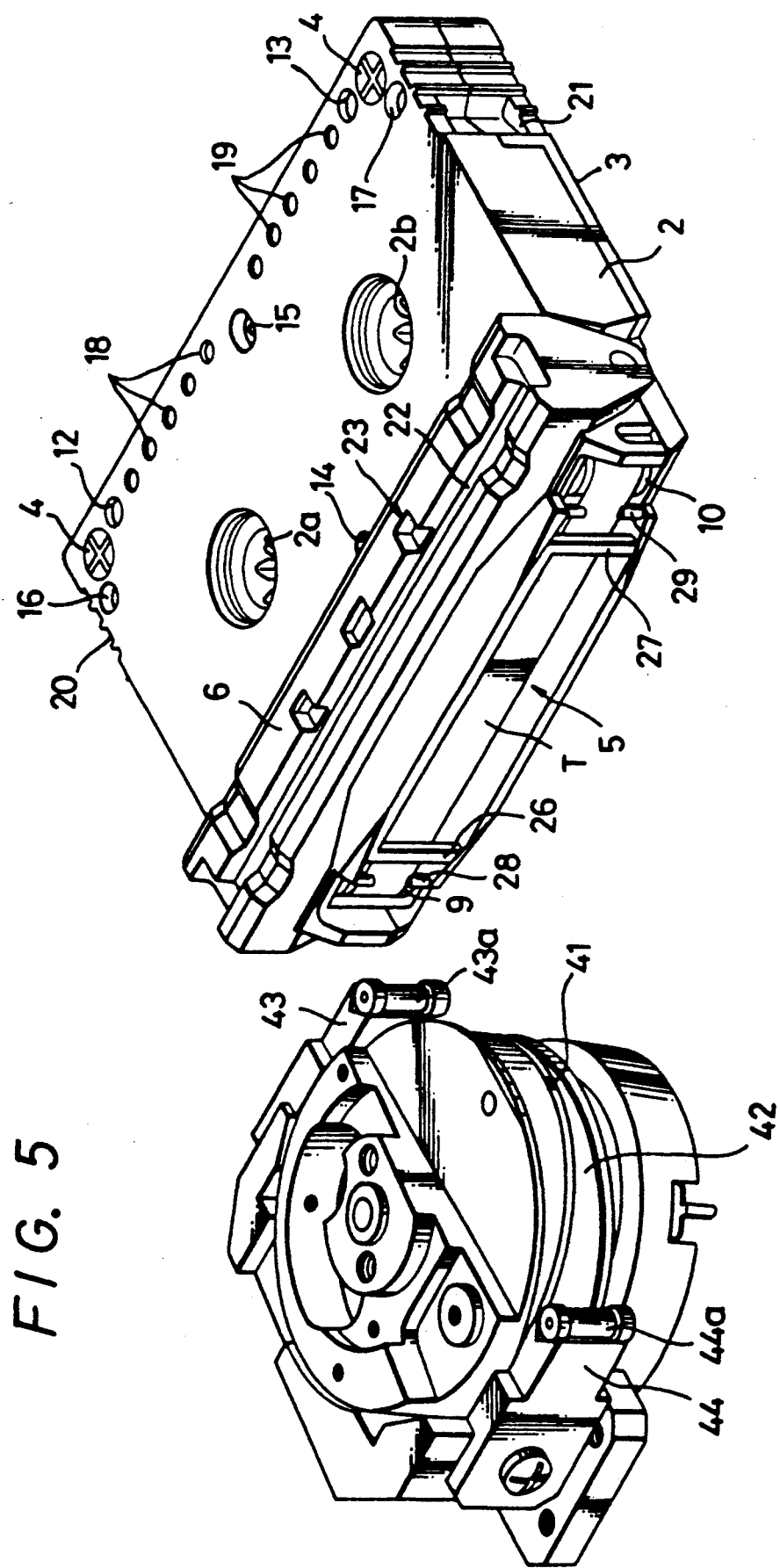
FIG. 5 is a perspective view used to show a relationship between the magnetic tape cassette and a head drum.

As shown in, for example, FIGS. 4 and 5, a changer engaging portion 23 is formed along a guide groove 22 extending along the lateral direction of the lid 6 which covers and uncovers the front surface side opening portion 5 of the cassette casing 1.

In the tape cassette constructed as described above, the magnetic tape T accommodated within the cassette casing 1 is recorded and/or reproduced by a rotary head according to the helical scan system.

More specifically, as shown in FIG. 5, a rotary head 41 is rotated at a predetermined slant angle relative to a head drum 42, and the head drum 42 is partially inserted into the front surface side opening portion 5 which is uncovered by rotating the lid 6 of the cassette casing 1 in the upper or lower direction. The magnetic tape T extended across the opening portion 5 is slidably moved so as to be wound around the peripheral surface of the head drum 42 that is inserted inside opening portion 5. Thus, when the rotary head 41 is rotated, slant tracks are formed so as to cross the magnetic tape T.

In this embodiment, in order to ensure that magnetic tape T is brought in slidable contact with the head drum 41 in a helical fashion, as shown in FIG. 6, a pair of tape guide members 24 and 25 whose guide portions are inclined in the opposite direction are disposed in the insertion portion of the opening portion 5 of the cassette casing 1 for the head drum 42 at their positions inside the guide rollers 9 and 10 such that they can be vibrated and moved in the lateral direction in an opposing fashion. When the head drum 42 is inserted into the opening portion 5, the tape guide members 24 and 25 come in contact with the peripheral surface of the head drum 42, and guide the magnetic tape T under the condition that the magnetic tape T is sandwiched between them and the peripheral surface of the head drum 42.

Further, as shown in FIG. 5, the head drum 42 has formed wing guides 43 and 44 at both its side portions which are inserted into the spaces between the pinch rollers 9, 10 and the tape guide members 24, 25 in both side portions of the opening portion 5 of the cassette casing 1. Rollers 43a and 44a are mounted on the front end portions of the two wing guides 43 and 44, respectively and brought in slidable contact with the magnetic tape T, urging the magnetic tape T against the tape guide members 24 and 25.

As shown in FIG. 7, both the wing guides 43 and 44 are inserted into the opening portion 5 of the cassette casing 1 such that they are positioned in the spaces between supporting elements 26, 27 provided near the inside of the opening portion 5 and tape projection preventing guide protrusions 28, 29 positioned between the supporting elements 26, 27 and the pinch rollers 9, 10.

Figure 1:
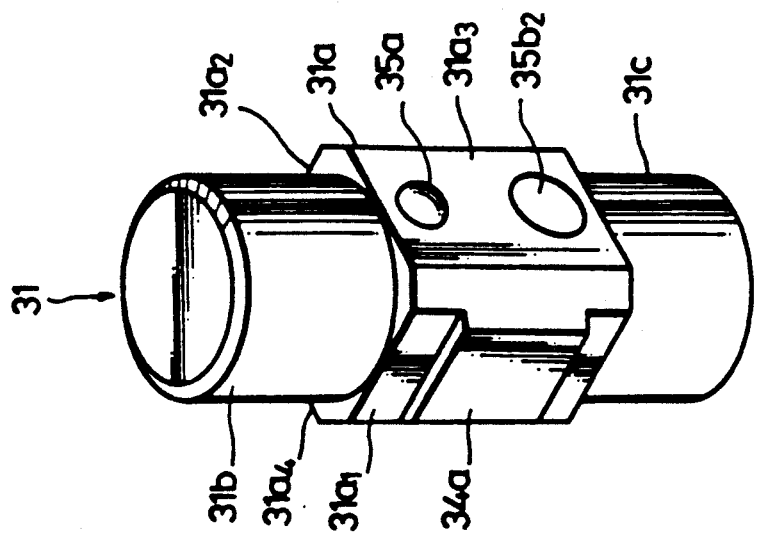
FIG. 1 is a perspective view of a protective plug which can be applied to the present invention.

In the tape cassette arranged as described above, the erasure preventing mechanisms 12 and 13 disposed in the cassette casing 1 will be described in detail with reference to FIGS. 1 to 3. Since the two erasure preventing mechanisms 12 and 13 are constructed the same, one erasure preventing mechanism 12 is illustrated and the other erasure preventing mechanism 13 therefore need not be shown in FIGS. 1 to 3.

In each of the erasure preventing mechanisms 12 and 13, a erasure preventing detection sliding member (hereinafter simply referred to as a protective plug) 31 is slidably inserted into an insertion aperture 32 which is bored through the cassette casing 1 at its rear side portion in the thickness direction of the cassette casing 1.

The protective plug 31 is molded of synthetic resin or the like which has flexibility to be deformed. The length of this protective plug 31 is shorter than that of the insertion aperture 32. An intermediate portion 31a thereof is formed to have a cross section of substantially a quadrilateral. Two end portions 31b and 31c thereof are formed to have circular cross sections. The intermediate portion 31a has formed on two opposing surfaces 31a1 and 31a2 stopper convex surfaces 34a and 34b in an opposing relation these stopper convex surfaces are placed about the center of the protective plug 31 lengthwise. The intermediate portion 31a has formed on the other two opposing surfaces 31a3 and 31a4 click stopper protrusions 35a and 35b of substantially hemispheric configuration. These click stopper protrusions 35a and 35b are displaced at a predetermined spacing from each other relative to the length direction of the protective plug 31 such that, even when the protective plug 31 is inverted, these click stopper protrusions 35a and 35b can be located at the same positions.

Protrusion surfaces 35a1 and 35b1 of the click stopper protrusions 35a and 35b are formed thin so that they can be slightly deformed due to their flexibility. That is, the protrusion surfaces 35a1 and 35b1 are formed thin by forming spot facing holes 35a2 and 35b2 having predetermined depths from the surfaces opposite to the protrusion surfaces of the click stopper protrusions 35a and 35b.

On the other hand, the insertion aperture 32 into which the protective plug 31 constructed as described above is inserted, is a hollow portion having an inner diameter nearly equal to the diameter of the transverse cross section of the intermediate portion 31a of the protective plug 31. The insertion aperture 32 is formed through the upper part 2 to the lower part 3 and stopper convex surfaces 36a and 36b are formed on inner wall surfaces of the insertion aperture 32 is an opposing relation in one direction i.e. surfaces 32a and 32b oppose the stopper convex surfaces 34a and 34b of the plug 31 across the jointed portion of the cassette upper and lower parts 2 and 3 of the casing 1 such that stopper convex surfaces 34a and 34b are slidably engaged therewith in the longitudinal direction of the insertion aperture 32. The stopper convex surfaces 34a and 34b are moved and engaged with the stopper concave portions 36a and 36b, whereby the stroke of the protective plug 31 is restricted.

Click stopper concave portions 37a and 37b are formed on the inner wall surfaces of the insertion aperture 32 opposing other surfaces, i.e. on its surfaces 32c and 32d opposing to the click stopper protrusions 35a and 35b of the protective plug 31 across the joined portion of the upper and lower parts 2 and 3 of the cassette casing 1 such that the click stopper concave portions 37a and 37b may be engaged with the click stopper protrusions 35a and 35b. A guide groove 37a1 extending to the upper part 2 side is formed to be continuously communicated to the click stopper concave portion 37a corresponding to one click stopper protrusion 35a. A guide groove 37b1 extending to the lower part 3 side is formed to be continuously communicated to the click stopper concave portion 37b corresponding to the other click stopper protrusion 35b. The two guide grooves 37a1 and 37b1 are shallower than the click stopper concave portions 37a and 37b, respectively.

Operations of the erasure preventing mechanisms 12 and 13, which are constructed by the protective plugs 31 and the insertion apertures 32, will be explained hereinafter.

Figure 2:
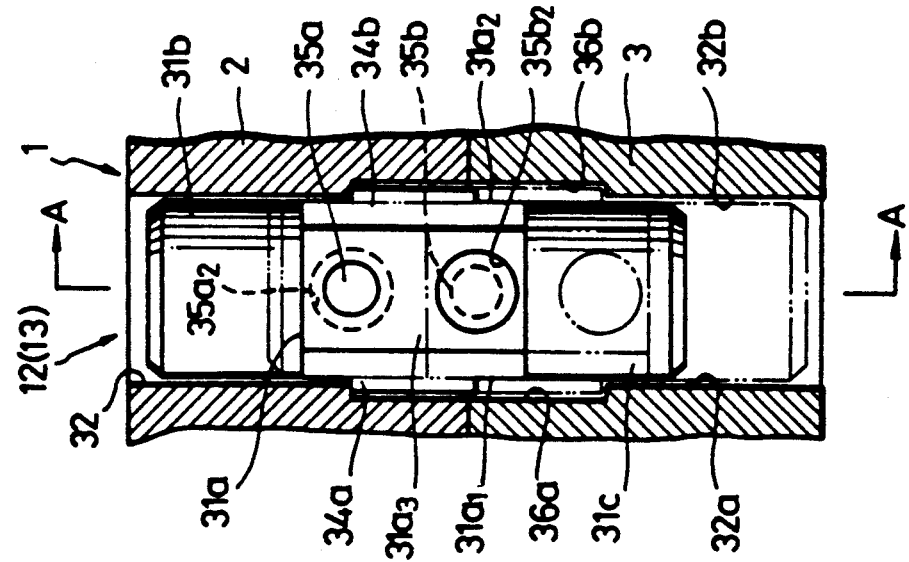
FIG. 2 is a front view illustrating the condition that the protective plug is attached to an insertion aperture of a cassette casing.

Initially, when the protective plug 31 in the insertion aperture 32 is located within the insertion aperture 32 at its upper position in the thickness direction of the cassette casing 1, or when it is located on the upper part 2 side, the stopper convex surfaces 34a and 34b of the protective plug 31 are respectively positioned in the stopper concave portions 36a and 36b of the insertion apertures 32 at the upper part 2 side, as shown by the solid lines in FIGS. 2 and 3, and under this condition, the click stopper protrusion member 35b is in engagement with the click stopper concave portion 37b. Since both the click stopper protrusion members 35a and 35b are positionally deviated from each other, one click stopper protrusion 35a is not engaged with one click stopper concave surfaces 37a and is urged against the guide groove 37a1 of the upper part 2 side. In this state, this click stopper protrusion 35a is pushed by a proper predetermined pushing force because the guide groove 37a1 urged therewith has the level difference between it and the inner wall surface of the insertion aperture 32 and the protrusion portion surface 35a1 is deformed with flexibility. By this pushing force, the other click stopper protrusion 35b is urged against and engaged with the other click stopper concave portion 37b so that the protective plug 31 is positively positioned and held at the upper side of the insertion aperture 32.

When the protective plug 31 is located at the lower position of the insertion aperture 32, that is, located at the lower part 3 side, as shown by two-dot chain lines in FIGS. 2 and 3, the stopper convex portions 34a, 34b are brought in contact with the stopper concave portions 36a, 36b in the lower part 3 side. Under this condition, one click stopper protrusion 35a is engaged with one click stopper concave portion 37a. The other click stopper protrusion 35b is disengaged from the other click stopper concave portion 37b and is urged against the guide groove 37b1 of the lower part 3 side.

In this state, similarly to the case that the protective plug 31 is located at the upper position, one click stopper protrusion 35a is urged against and engaged with one click stopper concave portion 37a by a proper pushing force of the other click stopper protrusion 35b similarly as described above, whereby the protective plug 31 is positively placed at the lower side of the insertion aperture 32.

In the position switching operation of the protective plug 31, since the protective plug 31 is moved under the condition that the click stopper protrusions 35a and 35b are brought in slidable contact with the inner surfaces of the guide grooves 37a1 and 37b1 continued to the click stopper concave portions 37a and 37b, the position of the protective plug 31 can be switched stably and smoothly. Particularly, in this embodiment, since the click stopper protrusions 35a and 35b are flexibly deformed in the direction in which they are pushed, the protective plug 31 can be moved more smoothly, and the click stopper protrusions 35a and 35b can be engaged with the click stopper concave portions 37a and 37b more positively.

Further, in the position switching operation of the protective plug 31, when the protective plug 31 is pushed by a larger pushing force than is necessary so that the click stopper protrusions 35a and 35b exceed over the click stopper concave portions 37a and 37b, the stopper convex surfaces 34a and 34b are contacted with and engaged with the end edges of the stopper concave portions 36a and 36b of the insertion aperture 32 to thereby inhibit the protective plug 31 from being slid further, thus preventing the protective plug 31 from being disengaged from the insertion aperture 32.

As described above, the position of the protective plug 31 is changed relative to the insertion aperture 32 of the cassette casing 1, and this change of the position is detected by a detecting switch through a detecting pin or the like, whereby the two conditions of the erase possible condition and the erasure preventing condition can be identified positively.

The erasure preventing mechanisms 12 and 13 of this embodiment can perform exactly the same position switching operation, that is, detecting operation as described above even when they are inverted in their up and down direction.

While the embodiment of this invention is described as above, the present invention is not limited thereto and various modifications thereof can be effected. For example, the shape of the transversal section of the protective plug 31 and the inner shape of the insertion aperture 32 are not limited to quadrilaterals and may be hexagonal or the like in which the stopper means can be formed of at least two opposing surfaces and the click stopper means can be formed of another two opposing surfaces.

According to the present invention, as described above, the magnetic tape cassette is provided, in which the stopper means for preventing the protective plug from being disengaged and the position click stopper means for engaging the protective plug at the predetermined switching positions of the erase possible condition and the erasure preventing condition and independently provided between the protective plug slidably inserted into the thickness direction of the cassette casing and the insertion aperture into which the protective plug is inserted, and the click stopper means is formed by coupling the protective plug and the guide portion. Therefore, the switching operation of the protective plug can be stably and smoothly carried out, whereby the magnetic tape cassette can be positively placed in the erase possible condition and the erasure preventing condition which ease.

Further, when the protective plug is pushed by a larger pushing force than is necessary in this switching operation or when the click stopper means is worn, the protective plug can be prevented from being disengaged from the insertion aperture and the erasure can be positively avoided, rendering the magnetic tape cassette high in reliability.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

I claim as my invention:

1. A magnetic tape cassette in which a signal recorded on a tape-shaped record medium accommodated therein can be prevented from being erased inadvertently by a sliding member movable by a user of said cassette and being slidably inserted within an insertion aperture formed through a cassette casing in a thickness direction of the cassette casing, said cassette comprising:
   disengagement preventing stopper means including convex portions formed on said sliding member and concave portions formed in said insertion aperture for preventing said sliding member from being disengaged from the cassette casing; and
   positioning click stopper means including protrusions formed on said sliding member separate and apart from said convex portions and click stopper concave portions formed in said insertion aperture separate and apart from said concave portions of said disengagement preventing stopper means for selectively stopping movement of said sliding member at predetermined switching positions so that a recorded signal can be erased or that the recorded signal can be prevented from being inadvertently erased, wherein said positioning click stopper means further includes guide groove portions respectively contiguous to said click stopper concave portions in said insertion aperture.

2. The magnetic tape cassette according to claim 1, wherein said sliding member has two end portions of cylindrical configurations and a central portion of rectangular configuration.

3. The magnetic tape cassette according to claim 1, wherein a pair of said sliding members are provided on a rear wall portion of said cassette casing.

4. The magnetic tape cassette according to claim 1, wherein said insertion aperture into which said sliding member is inserted is bored through an upper half and a lower half of said cassette casing.

5. The magnetic tape cassette as recited in claim 1, in which said protrusions of said positioning click stopper means comprise a pair of hemispherical click stopper protrusions formed on said sliding member, predeterminedly spaced and on opposite sides of said sliding member with respect to each other and a pair of blind spot facing holes formed in said sliding member and having a predetermined depth from surfaces opposite said click stopper protrusion surfaces for forming thin click stopper protrusions.

* * * * *